(12) United States Patent
Lin

(10) Patent No.: US 8,314,523 B2
(45) Date of Patent: Nov. 20, 2012

(54) FIXING STRUCTURE FOR THE SENSOR OF A CEILING FAN

(75) Inventor: Kuo Tsun Lin, Taichung (TW)

(73) Assignee: Chao-Chin Yao, Taichung (TW)

( * ) Notice: Subject to any disclaimer, the term of this patent is extended or adjusted under 35 U.S.C. 154(b) by 126 days.

(21) Appl. No.: 12/960,769

(22) Filed: Dec. 6, 2010

(65) Prior Publication Data

US 2012/0139394 A1 Jun. 7, 2012

(51) Int. Cl.
*H02K 11/00* (2006.01)

(52) U.S. Cl. ........................................ 310/68 B; 310/91

(58) Field of Classification Search ............... 310/68 C, 310/68 B, 91, 62, 214, 215
See application file for complete search history.

(56) References Cited

U.S. PATENT DOCUMENTS

| 4,549,104 A * | 10/1985 | Niimura et al. ............. 310/67 R |
| 5,610,464 A * | 3/1997 | Asano et al. ............. 310/156.45 |
| 7,332,840 B2 * | 2/2008 | Ku et al. ..................... 310/68 R |
| 2003/0057781 A1 * | 3/2003 | Shukuri et al. ............. 310/68 B |
| 2007/0267927 A1 * | 11/2007 | Chen ........................... 310/68 B |

* cited by examiner

*Primary Examiner* — Nguyen N Hanh
(74) *Attorney, Agent, or Firm* — Wang Law Firm, Inc.; Li K. Wang; Stephen Hsu

(57) ABSTRACT

A fixing structure for the sensor of a ceiling fan is disclosed. The stator of the ceiling fan has several coil arms in equal spacing for field coils to wind around. A magnetic pole spacer is formed between each adjacent two coil arms. The magnetic pole spacer has a supporting base for the disposition of a sensor to sense the position of the rotor.

4 Claims, 7 Drawing Sheets

FIXING STRUCTURE FOR THE SENSOR OF A CEILING FAN

BACKGROUND OF THE INVENTION

1. Field of Invention

The invention relates to the structure of a ceiling fan motor and, in particular, to a fixing structure for the sensor of a ceiling fan.

2. Related Art

As shown in FIG. 7, the ceiling fan motor with a built-in sensor in the prior art has a stator 62 inside a rotor 61. The stator 62 has a photo interrupter 63. The inner wall of the rotor 61 has a plurality of corresponding interrupting plates 64 for the photo interrupter 63, replacing the Hall sensor and magnet in usual ceiling fan motors.

However, the installation procedure of the conventional ceiling fan motor with a built-in sensor is very complicated. Using the interrupting plates 64 instead of a magnet further complicates the assembly by positioning. Moreover, if there is an error in the installation of the photo interrupter in the narrow space inside the ceiling fan motor, the interrupting plates 64 and the photo interrupter 63 will produce noises due to friction. Furthermore, the ceiling fan motor with a built-in sensor has the problem of too many elements on a circuit board and thus lowering the reliability thereof.

SUMMARY OF THE INVENTION

An objective of the invention is to provide a fixing structure for the sensor of a ceiling fan that has a simple structure for quick assembly. Thus, the invention can improve the assembly efficiency.

Another objective of the invention is to provide a fixing structure for the sensor of a ceiling fan that effectively reduce sensing errors between the sensor and the sensing magnets, ensuring the stability during the operation of the rotor.

To achieve the above-mentioned objectives, the disclosed fixing structure for the sensor of a ceiling fan includes: a motor axle, a stator, and a rotor. The stator is composed of a predetermined number of silicon steel sheets stacked on the motor axle. The rotor is pivotally mounted on the motor axle of the stator. The rotor has a predetermined number of sensing magnets inside. Corresponding sensing magnets are also disposed around the stator. Moreover, the stator has several coil arms in equal spacing for field coils to wind around. A magnetic pole spacer is formed between each adjacent coil arms. A supporting base is disposed a predetermined magnetic pole spacer. The supporting base holds one sensor for sensing the positions of the sensing magnets on the rotor.

The supporting base consists of two opposite pinching arms on the opening end of the insulating plate in the magnetic pole spacer. The sensor is correspondingly embedded in the supporting base composed of the two pinching arms.

Alternatively, the supporting base consists of two opposite pinching arms attached to a predetermined magnetic pole spacer of the stator. The sensor is correspondingly embedded in the supporting base composed of the two pinching arms.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
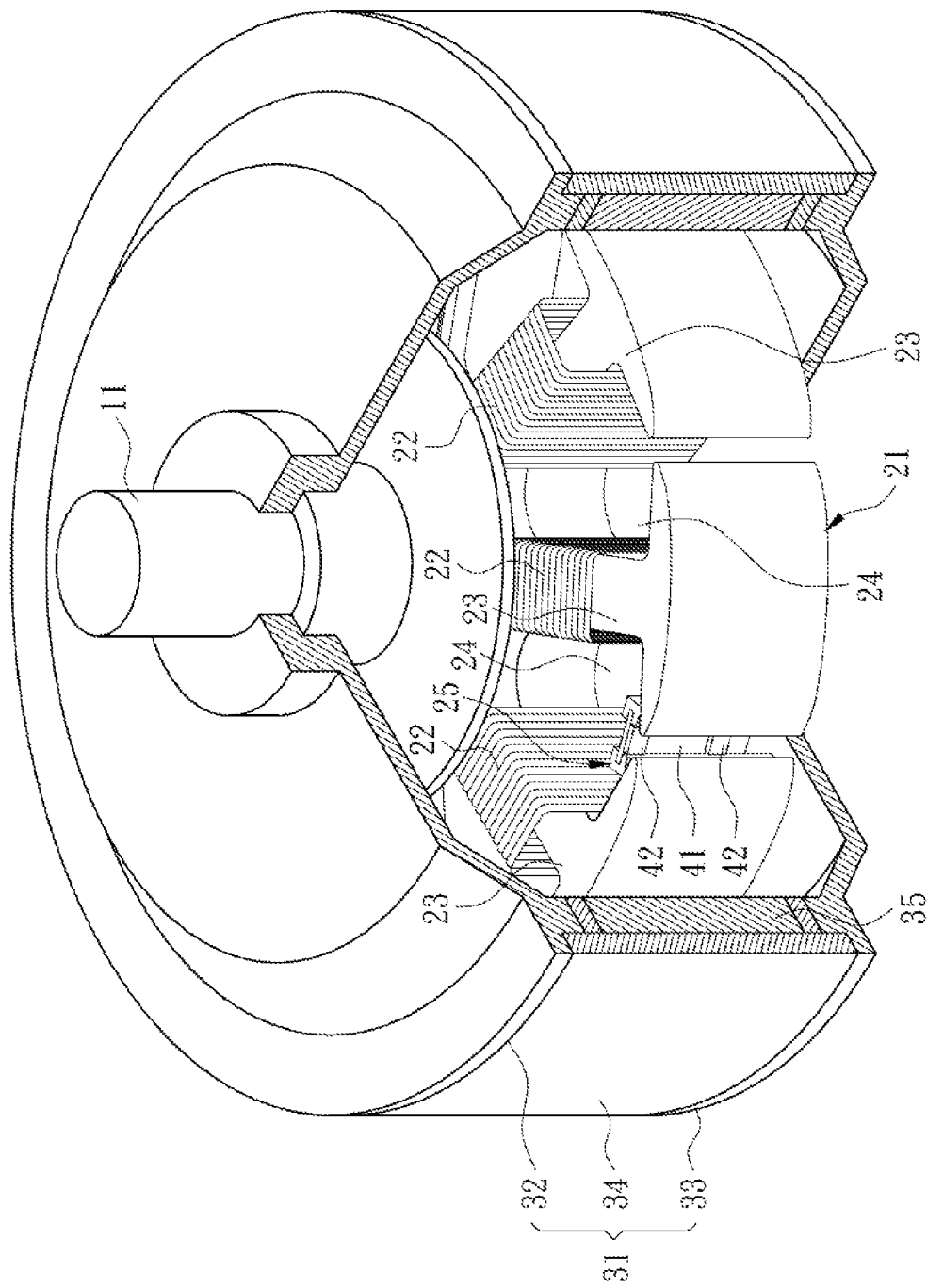
FIG. 1 is a three-dimensional view of the first embodiment of the invention.
Figure 2:
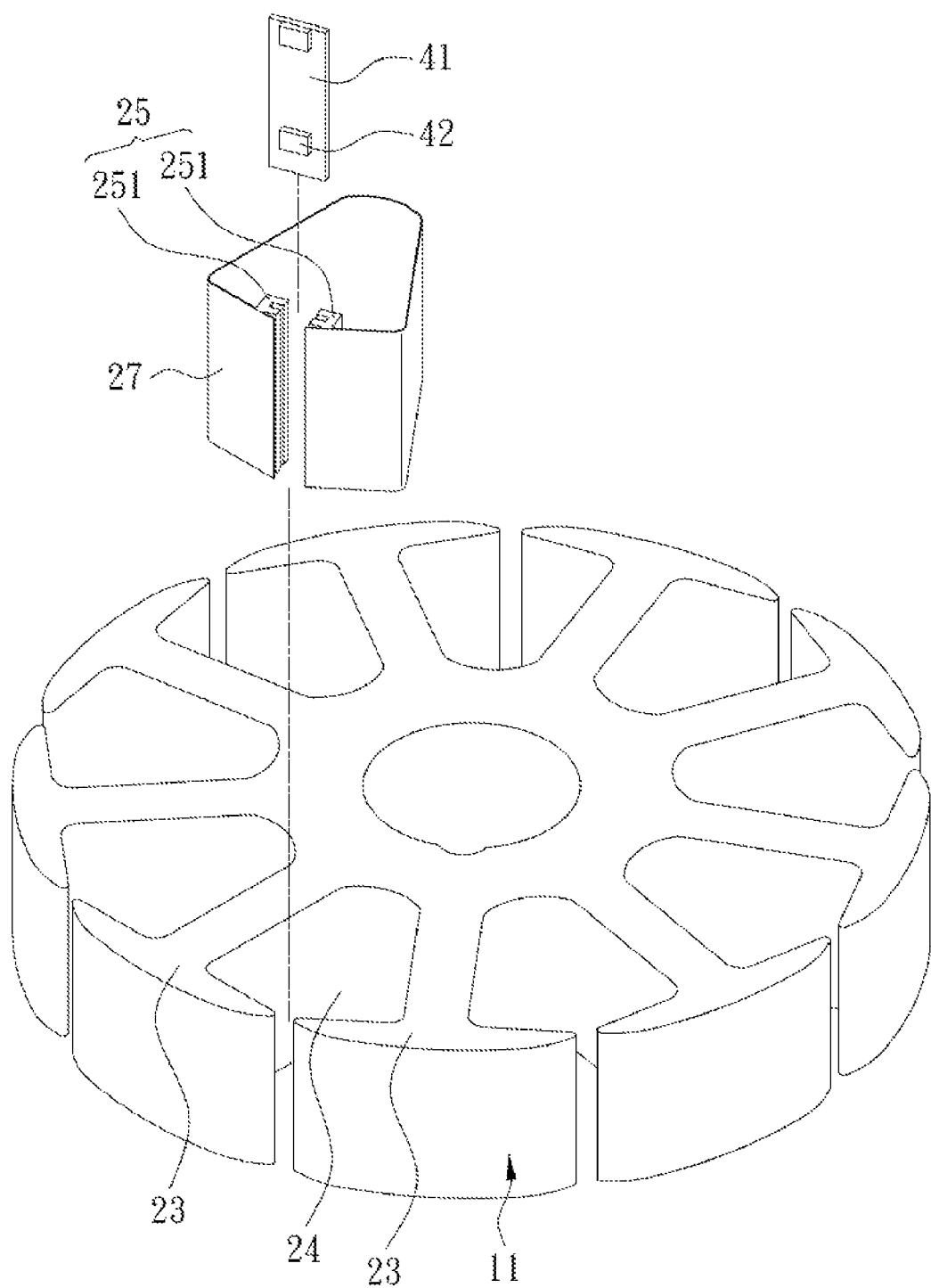
FIG. 2 is an assembly view of the first embodiment.
Figure 3:
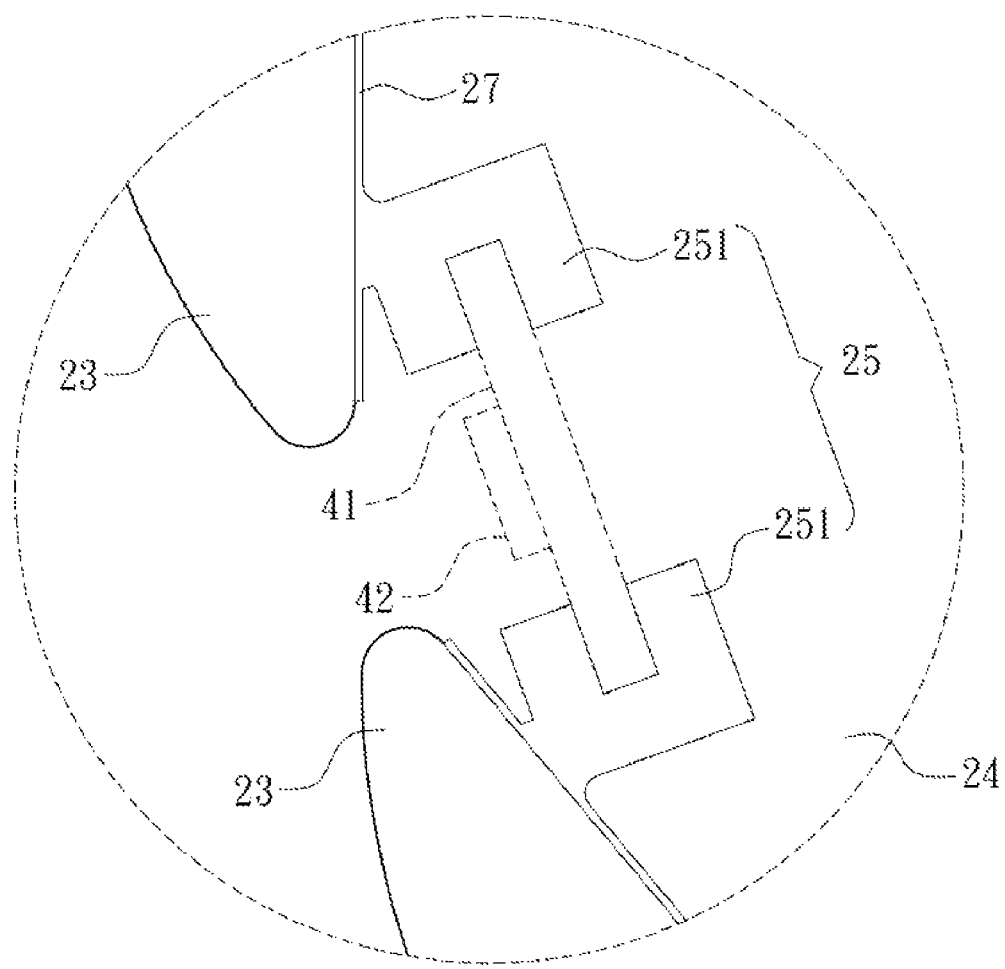
FIG. 3 is a locally enlarged view of the assembled first embodiment.

First, please refer to FIGS. 1 to 3 for a first embodiment of the fixing structure for the sensor of a ceiling fan motor according to the invention. In this embodiment, the ceiling fan motor includes a motor axle 11, a stator 21, and a rotor 31.

The stator 21 is fixed on the motor axle 11. The stator 2 is formed by stacking a predetermined number of silicon steel sheets. The stator 21 has several coil arms 23 disposed in equal spacing for field coils 22 to wind around. A magnetic pole spacer 24 is formed between each adjacent two coil arms 23. At least one predetermined magnetic pole spacer 24 has a supporting base 25 for holding a sensor 41. The sensor 41 is electrically connected with more than one sensing unit 42. In this embodiment, the magnetic pole spacer 24 correspondingly accommodates a roughly U-shaped insulating plate 27. The opening end of the insulating plate 27 has two opposite pinching arms 251. The supporting base 25 consists of the two opposite pinching arms 251 at the opening end of the insulating plate 27 in the magnetic pole spacer 24. The sensor 41 is embedded in the supporting base 25 of the two pinching arms 251. The sensor 41 has two sensing units 42.

The rotor 31 is pivotally installed on the motor axle 11 and around the stator 21. The rotor 31 has an upper shell 32, a lower shell 33, a middle ring 34, and a predetermined number of sensing magnets 35. The sensing magnets 35 are fixed on the inner ring wall of the middle ring 24 and around the stator 21, in order to interact with the sensor 41 in the supporting base 25.

The assembler of the invention only needs to install the insulating plate 27 in the predetermined magnetic pole spacer 24, followed by embedding the sensor 41 to the supporting base 25 formed at the opening end of the insulating plate 27. The sensor 41 can then be firmly fixed in the supporting base 25 by tight fit or gluing. As the sensing magnets 35 rotate with the rotor 31, the sensing units on the sensor 41 can detect the locations of the sensing magnets 35 on the rotor 31 and send a sensing signal to the sensor 41. According to the received sensing signal, the sensor 41 drives the field coils 22 on the stator 21 to produce a corresponding magnetic field so as to let the rotor 31 rotate continuously.

According to the above description, the sensor 41 is disposed in the magnetic pole spacer 24 formed between adjacent coil arms 23. The space is effectively used without breaking the existing stator 21 or rotor 31 structure. In addition to saving the cost for adding extra sensing magnets, the simple structure of the invention also makes the assembly much easier. The assembly efficiency is thus improved.

Moreover, the fixing structure for the sensor of a ceiling fan motor first has the insulating plate 27 in the predetermined magnetic pole spacer 24. The sensing units 41 of the sensor 42 are then embedded in the supporting base 25 formed by the opening end of the insulating plate 27. So the sensor 42 is precisely positioned in the magnetic pole spacer 24. This can effectively reduce the sensing error between the sensor 42 and the sensing magnets 35, ensuring the stability of the operation of the rotor 31.

Figure 4:
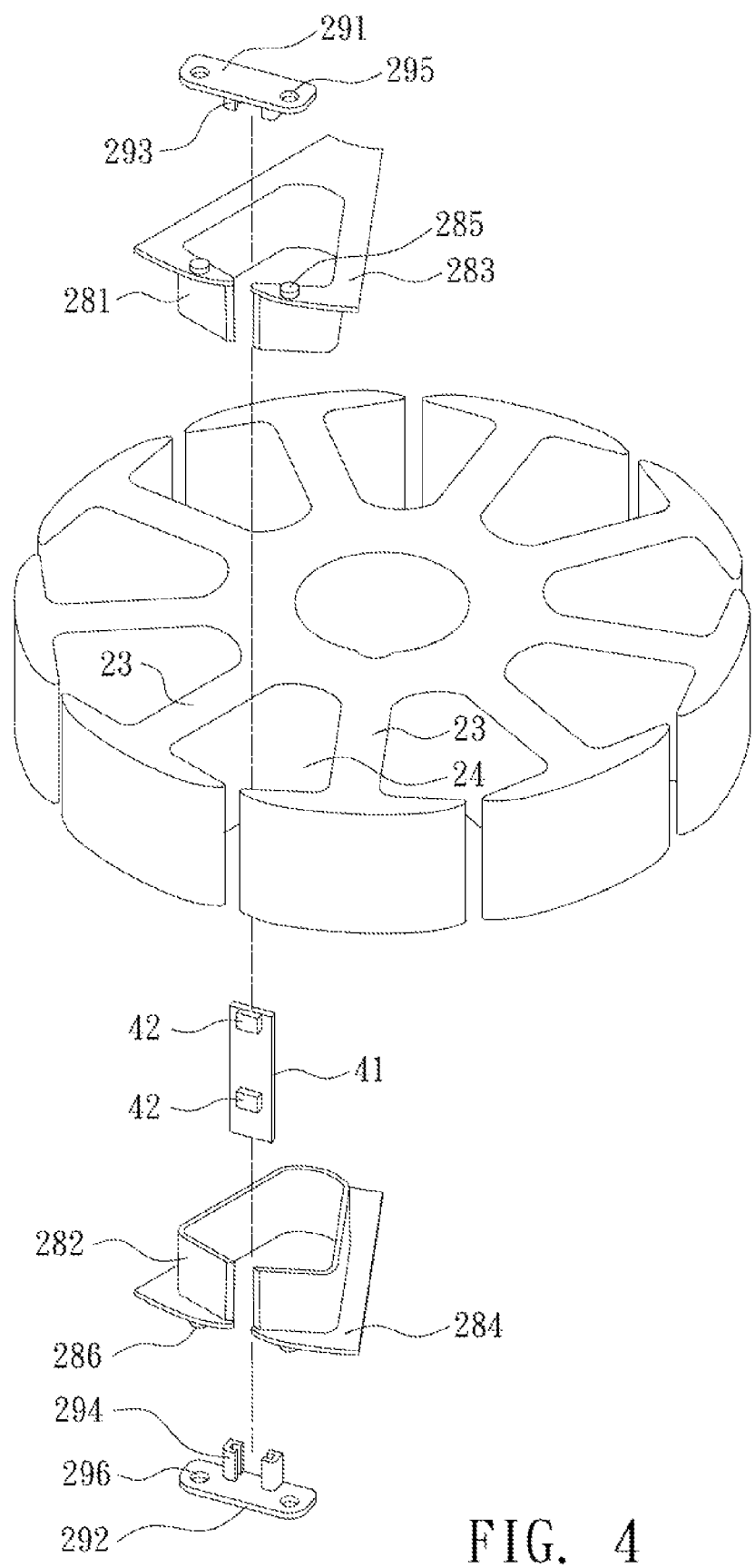
FIG. 4 is an exploded view of the second embodiment of the invention.
Figure 5:
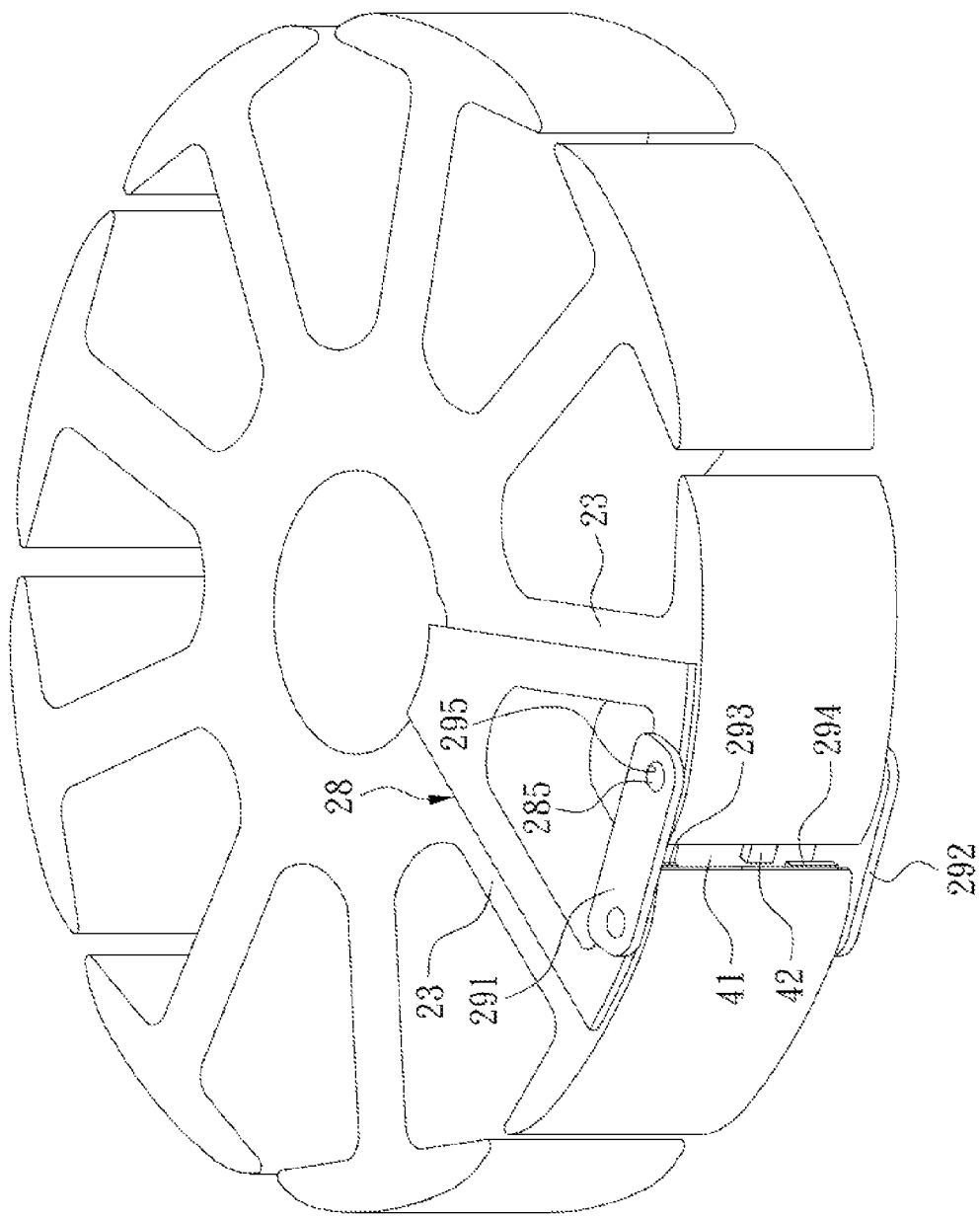
FIG. 5 shows the appearance of the second embodiment after assembly.
Figure 6:
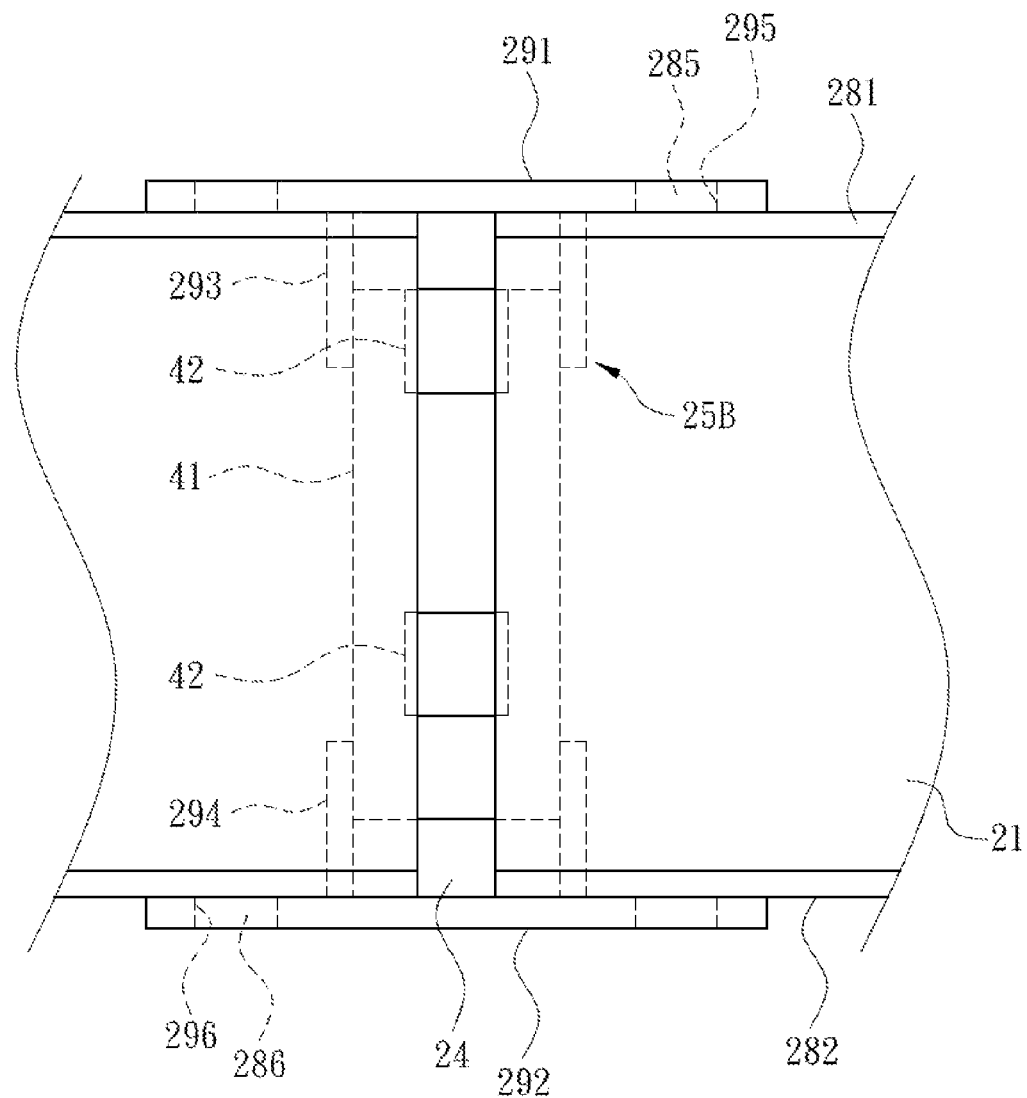
FIG. 6 shows the structure of the second embodiment after assembly.
Figure 7:
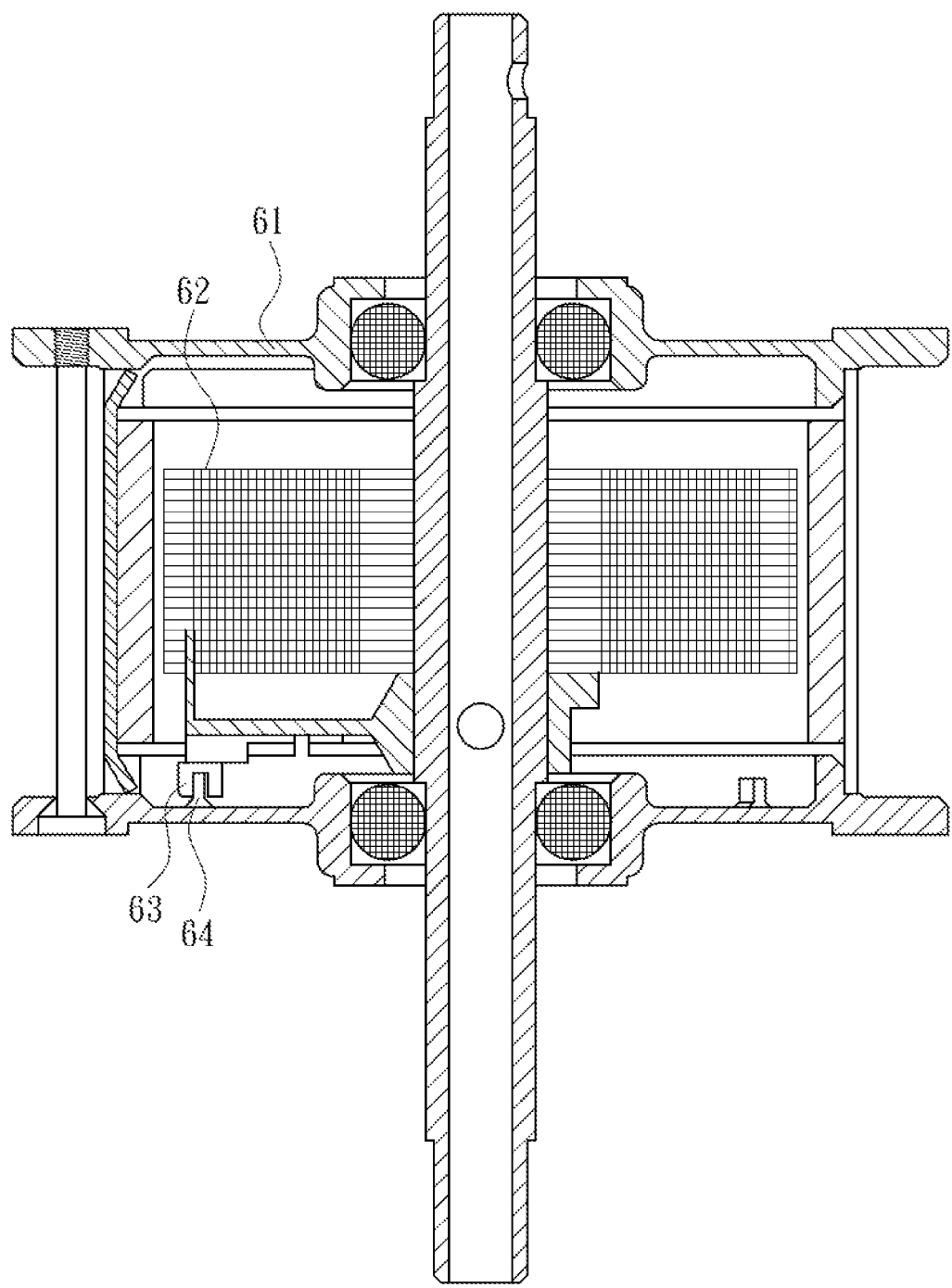
FIG. 7 is a schematic view of a conventional ceiling fan motor.

Please refer to FIGS. 4 to 6 for a second embodiment of the invention. It differs from the first embodiment in that the U-shaped insulating plate 27 consists of an upper component 281 and a lower component 282, both accommodated in one of the magnetic pole spacer 24 of the stator 21. The upper component 281 and the lower component 282 further extend to form contacting surfaces 283, 284 to contact with the upper and lower end surfaces of the adjacent coil arms 23. The two contacting surfaces 283, 284 of the two components 281, 282 near both sides of the opening end have positioning parts 285, 286, respectively. The positioning parts 285, 286 on the two components 281, 282 are in connection with an upper lid 291 and a lower lid 292. The upper lid 291 extends downward to form two opposite first arms 293, and the lower lid 292 extends upward to form two opposite second arms 294. When the two lids 291, 292 simultaneously connect to the positioning parts 285, 286 of the two components 281, 282, the first arms 293 and the second arms 294 are in the magnetic pole spacer 24. With such a configuration, the first arms 293 and the second arms 294 form the structure of the supporting base 25B for holding the sensor 41. In this embodiment, the positioning parts 285, 286 on the two components 281, 282 are two separate protruding posts. The two lids 291, 292 have respectively two connecting holes 295, 296 on the two sides corresponding to the two protruding posts. The first arms 293 and the second arms 294 are between the two connecting holes 295, 296 of the two lids 291, 292.

With the above-mentioned structure, the second embodiment of the invention can also make good use of the space of the magnetic pole spacer 24 between two adjacent coil arms 23 of the stator 21. It achieves the goals of easy assembly and low cost. The sensing error between the sensor 41 and the sensing magnets 35 can be reduced during the assembly, thereby ensuring the stability of the operation of the rotor 31.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A fixing structure for the sensor of a ceiling fan motor having
    a motor axle,
    a stator fixed on the motor axle, and
    a rotor, pivotally mounted on the motor axle and around the stator, consisting of a predetermined number of silicon steel sheets stacked on the motor axle, the rotor having a predetermined number of sensing magnets, and the sensing magnets being disposed around the stator; the stator having a plurality of coil arms, separated from each other in equal spacing, for field coils to wind around, a magnetic pole spacer being formed between two adjacent coil arms, a magnetic pole spacer having a supporting base for accommodating a sensor for detecting positions of the sensing magnets on the rotor,
    wherein the magnetic pole spacer accommodates a U-shaped insulating plate with an opening end and a supporting base, the opening end of the insulating plate forms two opposite pinching arms, the supporting base is formed by the two opposite pinching arms at the opening end of the insulating plate, and the sensor is embedded in the supporting base.

2. The fixing structure for the sensor of a ceiling fan motor according to claim 1, wherein the sensor is electrically connected with a plurality of sensing units for receiving a sensing signal detected by the sensor.

3. A fixing structure for the sensor of a ceiling fan motor having
    a motor axle,
    a stator fixed on the motor axle, and
    a rotor, pivotally mounted on the motor axle and around the stator, consisting of a predetermined number of silicon steel sheets stacked on the motor axle, the rotor having a predetermined number of sensing magnets, and the sensing magnets being disposed around the stator; the stator having a plurality of coil arms, separated from each other in equal spacing, for field coils to wind around, a magnetic pole spacer being formed between two adjacent coil arms, a magnetic pole spacer having a supporting base for accommodating a sensor for detecting positions of the sensing magnets on the rotor,
    wherein the magnetic pole spacer accommodates a U-shaped insulating plate, the U-shaped insulating plate consists of an upper component and a lower component, both the upper component and the lower component accommodated in one magnetic pole spacer, the upper component and the lower component extend away from each other to form respectively an upper contacting surface with two positioning parts and a lower contacting surface with two positioning parts, the positioning parts of the upper component and the lower component are in connection with an upper lid and a lower lid, respectively, the upper lid extends downwardly to form two opposite first arms, and the lower lid extends upwardly to form two opposite second arms, when the two lids are connected to the positioning parts of the two components, the first arms and the second arms are inside the magnetic pole spacer and form the supporting base for the sensor.

4. The fixing structure for the sensor of a ceiling fan motor according to claim 3, wherein the positioning parts of the two components are two separate protruding posts; the two lids have two connecting holes corresponding to the two protruding posts on both sides; and the first arms and the second arms are between the two connecting holes of the lids.

* * * * *